Oct. 13, 1959     G. F. GLAVE     2,908,522
ADJUSTABLE TRUNK LID LASH
Filed Aug. 2, 1956     2 Sheets-Sheet 2
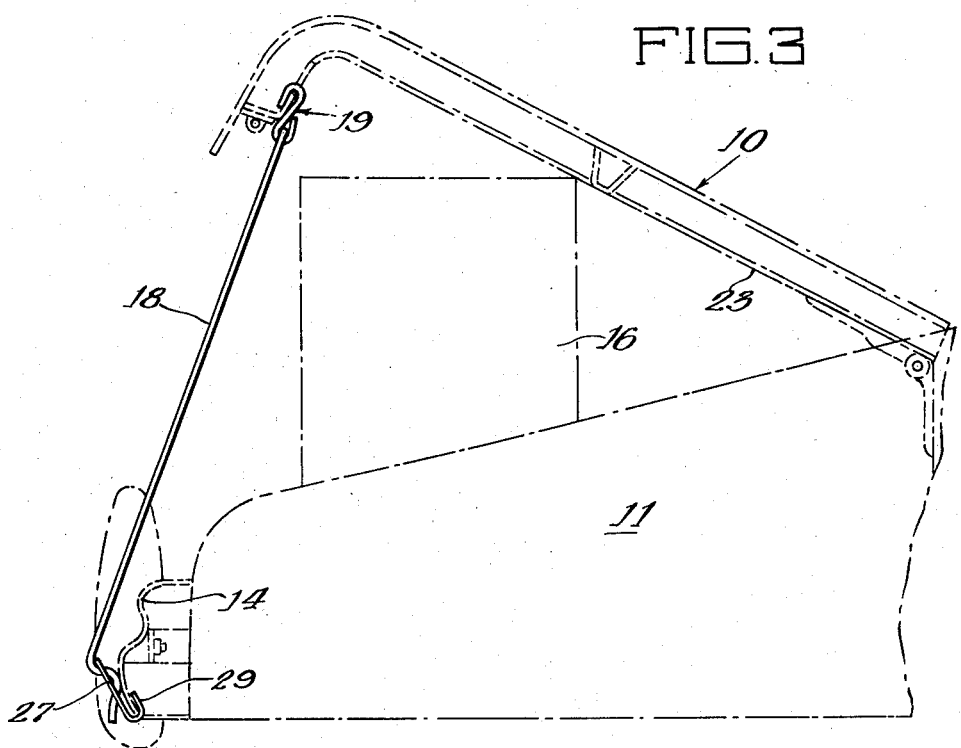
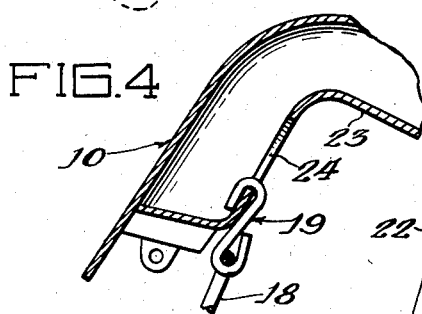
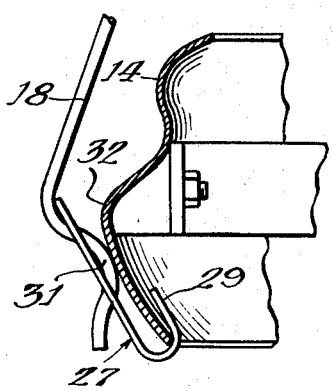
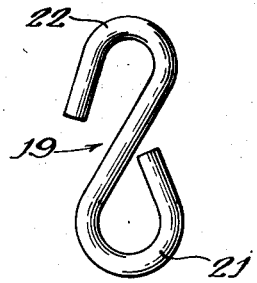
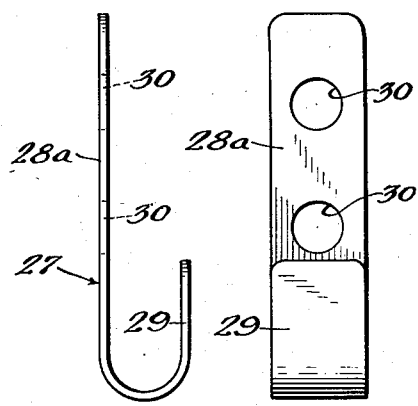
Inventor:
Glenn F. Glave
By: Schroeder, Hofgren,
Brady & Wegner
Attorneys United States Patent Office 2,908,522
Patented Oct. 13, 1959

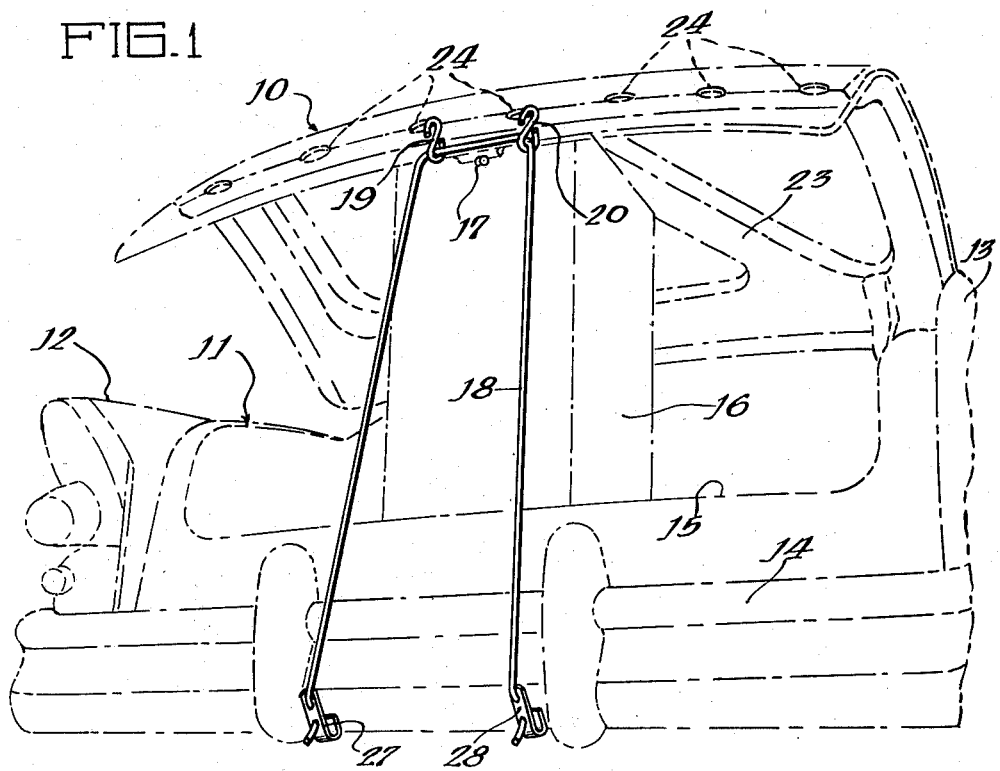
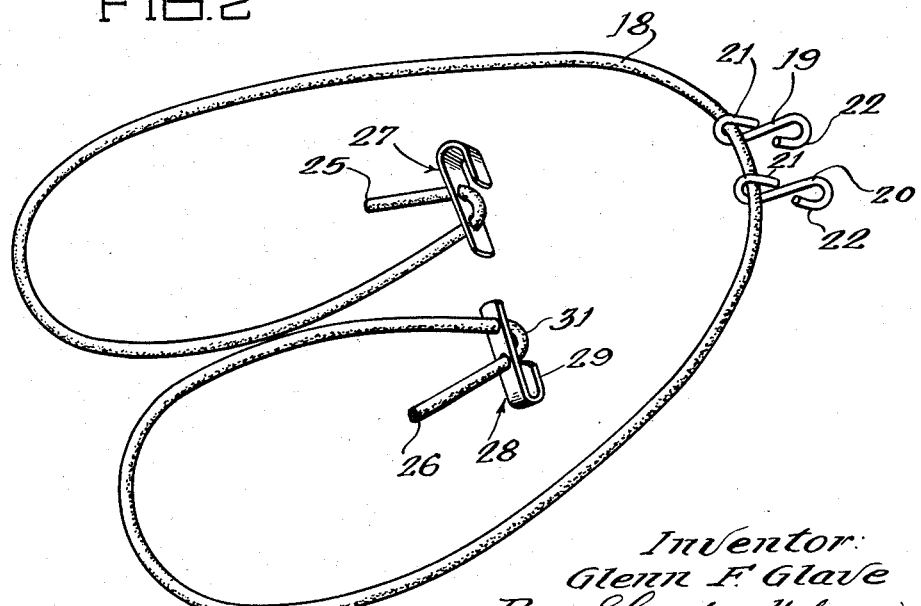

2,908,522
ADJUSTABLE TRUNK LID LASH
Glenn F. Glave, Chicago, Ill.
Application August 2, 1956, Serial No. 601,835
1 Claim. (Cl. 292—288)

This invention relates to an automotive accessory and more particularly to a device adapted to hold a vehicle closure, such as an automobile trunk lid, in a desired position upon a load in the vehicle or a compartment thereof, such as a trunk compartment.

The construction of present day automobiles generally provide a trunk compartment having a relatively large trunk lid which may be closed and yet provide considerable luggage or load carrying compartments. At various times, it is convenient to carry a load in a trunk compartment which will not permit the trunk lid to be closed and latched in the usual way. It is the latter circumstance that presents a problem since most trunk lids are at least, in part, counter-balanced to hold them in a wide open position without the use of struts or other braces. This condition permits the hauling of a bulky article in a passenger automobile trunk compartment with the lid fully open, however, the open lid blocks rear vision through the rear window creating a safety hazard.

The present invention contemplates an accessory which will permit the ready lashing of a trunk lid in a partially open position upon and against a load in the trunk compartment of an automobile. It is therefore the object of this invention to provide a new and improved automotive accessory of the character described.

Another object is to provide an accessory permitting a quick application and removal of the structure to a trunk lid in order to hold the lid in desired position.

Another object is to provide an improved lashing structure which will resiliently hold a vehicle closure against a load even through vibration and shifting of the load might tend to move the closure relative to the automotive vehicle.

A further object is to provide a lashing structure of the character described which is compact in size permitting storage in a very small space when not in use.

An additional object is to provide a structure of the character described which may be applied to present day automobiles without marring the decorative finish of the automobile.

Further objects, features and advantages of the present invention will be apparent from the following description of a preferred embodiment taken in connection with the accompanying drawings, in which:

Figure 1 is a perspective view partially broken away, of the present invention shown in operative position upon a vehicle illustrated in phantom outline.

Figure 2 is a perspective view of the lashing structure removed from its operative position as shown in Figure 1.

Figure 3 is a side elevational view of the structure shown in operative position as in Figure 1 with parts of an automobile shown in phantom outline.

Figure 4 is a fragmentary sectional view through a portion of the apparatus showing a connection of the structure to a vehicle trunk lid.

Figure 5 is a view similar to Figure 4 showing the connection of another part of the structure to a vehicle bumper.

Figure 6 is an enlarged plan view of one of the hook structures of the device.

Figure 7 is a side elevational view of one of the clasp structures of the device, and Figure 8 is a plan view of the clasp structure shown in Figure 7.

The present accessory is intended to be used for holding a trunk lid resiliently against a load placed in the trunk compartment in such a manner that it will not permit the trunk lid to be closed and latched. Since most trunk lids of present day automobiles are counter-balanced by springs and hinge structures to remain open when unlatched, it is contemplated that the present latching structure will also overcome the spring loading tending to open the trunk lid.

As illustrated in Figure 1, the rear deck or trunk lid 10 of an automobile is shown in open position relative to the trunk opening 11 formed in the rear body panel between fenders 12 and 13. The rear bumper 14 is shown below the lower edge 15 of the trunk opening. A box 16 is shown in dotted outline as within the trunk compartment. This box is of sufficient size so that the trunk lid 10 cannot be closed and latched by its own latching structure 17 in the usual manner. The trunk lid 10 is however brought downwardly against the upper end of the box 16 to the extent that it can be toward closed position. It is desirable to hold the trunk lid in this position since the box will thus be held against moving about in the trunk compartment and the trunk lid may be in a sufficiently low position to allow the driver of the vehicle to have a view of the road behind through the usual rear window. The accessory of the present invention is particularly adapted to accomplish these purposes.

As best seen in Figure 2 the present automotive accessory includes a length of cord or rope 18 preferably formed of an elastic material. A solid extrusion of neoprene rubber has been found extremely satisfactory since it is not affected by the usual grease and oils associated with automotive vehicles. A pair of hook members 19 and 20 each of generally S-shape are loosely threaded on the length of cord 18 with one eye 21 closed and the other eye 22 being open. These hooks are intended to grasp in the inner liner 23 formed in the trunk lid. It has been found that the inner liner spot welded on the inside of a trunk deck is provided with a number of openings or holes 24 into which the open eye part 22 of the hooks may readily be inserted in order to fasten them to the trunk. This provides a convenient and readily applied means for securing the accessory to the trunk lid.

The cord length 18 has a pair of free ends 25 and 26 and clasp members generally indicated 27 and 28 respectively are secured one to each end. The clasp is more clearly shown in Figures 7 and 8 wherein it will be noted that a straight shank portion 28a is integrally formed with an adjacent hook portion 29. A pair of stamped openings 30 are formed in the shank portion in spaced relation for the reception of the cord member looped therethrough as indicated in Figure 2. An adjustment in the length of the cord member between the two clasp members may be made at either clasp member. The openings 30 are sufficiently large to freely pass the cord member when the shank is perpendicular to the cord. If the cord is pulled generally in the direction of the shank so that the opening 30 binds on the cord, no slippage between the clasp and cord will occur.

It will be noted in Figure 3 that the cord member 18 is stretched between the hooks 19, 20 and the clasps 27, 28. It is preferred that the cord be taut taking up some of the resiliency inherent in the cord material. In applying or attaching the device to an automobile, it has been found quite easy to first apply the hooks 19 and 20 to the trunk after which one of the clasps such as 27 may be hooked under the bumper in the manner illustrated in Figures 1, 3 and 5. It will be noted in Figure 5 that the cord 18 is so threaded through the clasp openings 30 that a loop portion 31 bears against the chromium face 32 of the bumper preventing the clasp member from touching the polished bumper surface. The hook portion merely extends about the lower edge of the bumper which attachment will not mar the bumper.

Continuing with the application of the device to an automobile, it may be assumed that both hooks and one clasp have thus been applied. The cord member 18 will slide freely through the eyes of the two hook members so that the remaining clasp 28 may be pulled downwardly sufficiently to allow the hooked portion thereof to pass around the lower edge of the bumper. The cord should be adjusted through the shank of the clasp member 28 sufficiently to make the cord taut when the device is in its final position as illustrated in Figures 1 and 3. The cord may be pulled through the openings 30 in the clasp member quite easily when strain is removed from the members and the clasp shank held perpendicular to the cord. A short length of the cord member seems to have very little stretch, however, a sufficiently long length as used in the device will permit several inches of stretch, enough to allow ready hooking of the clasp members in place after an adjustment has been made in the effective length of the cord.

It has been found that the present device when properly applied will hold the trunk lid in place resiliently against the load in the trunk compartment. The load thus is held in place even though rough roads are traversed. The finished surface of the automobile including the bright work are not marred by the application of the accessory. It is contemplated that a single hook and a single clasp might be used with a single strand of the cord 18 extending between them. Other applications of the accessory might be made for holding articles on an automotive roof top or for latching tarpaulins and the like in desired position.

The foregoing detailed description has been given for clearness of understanding only, and no unnecessary limitations should be understood therefrom, for some modifications will be obvious to those skilled in the art.

I claim:

An accessory for binding an automobile trunk lid against a load in the trunk holding the lid open, comprising: a cord member substantially round in section formed of resiliently extensible rubber material, a pair of hook means each having an eye slidably receiving the cord therethrough and a hook portion for securing a portion of the cord member to the trunk lid with a free end extending therefrom, a pair of clasp members each generally on an end of the cord member and each having an elongated flat metal shank and a hook portion on one end of the shank, each clasp member shank having a pair of apertures spaced longitudinally of the shank with one of the apertures closely adjacent said hook portion, said apertures having a size and shape slightly in excess of the cross-sectional size and shape of the cord member so as to freely pass said cord member therethrough when the cord member is directed to the apertures generally normal to the flat metal shank, the sides of the opening binding upon the cord member extending therethrough when the cord is directed toward the shank substantially out of normal thereto, said cord extending through said apertures in sequence with a portion of the cord material between said apertures being exposed on the side of said shank facing said hook portion, said hook portion being opened for grasping the lower edge of the autobile bumper with said cord stretched between the trunk lid and bumper and the portion of said cord between said apertures forming a resilient material pad engaging said shank and bumper preventing marring of the exposed bumper surface.

References Cited in the file of this patent

UNITED STATES PATENTS

| | | |
|---|---|---|
| 481,425 | Robinson | Aug. 23, 1892 |
| 1,199,876 | Chidester | Oct. 3, 1916 |
| 1,219,199 | Troop | Mar. 13, 1917 |
| 1,599,342 | Muhlfeld | Sept. 7, 1926 |
| 2,496,085 | Engleheart | Jan. 31, 1950 |
| 2,555,430 | Weeks | June 5, 1951 |
| 2,563,698 | Whitebread | Aug. 7, 1951 |
| 2,668,458 | Russell | Feb. 9, 1954 |
| 2,715,008 | Huber | Aug. 9, 1955 |
| 2,738,204 | Ibey | Mar. 13, 1956 |
| 2,762,542 | Hodgeman | Sept. 11, 1956 |